United States Patent [19]

Sakakiyama

[11] Patent Number: 4,550,816
[45] Date of Patent: Nov. 5, 1985

[54] SYSTEM FOR CONTROLLING STALL SPEED FOR AN ELECTROMAGNETIC CLUTCH

[75] Inventor: Ryuzo Sakakiyama, Tokyo, Japan

[73] Assignee: Fuji Jukogyo Kabushiki Kaisha, Tokyo, Japan

[21] Appl. No.: 461,333

[22] Filed: Jan. 27, 1983

[30] Foreign Application Priority Data

Jan. 29, 1982 [JP] Japan .............................. 57-13550

[51] Int. Cl.⁴ .................. F16D 37/02; B60K 41/00; B60K 41/02
[52] U.S. Cl. ........................ 192/0.052; 192/0.076; 192/0.092; 192/3.56; 192/21.5
[58] Field of Search ............. 192/0.052, 21.5, 0.092, 192/0.076, 3.58, 3.56, 103 R, 0.032

[56] References Cited

U.S. PATENT DOCUMENTS

| | | | |
|---|---|---|---|
| 3,073,422 | 1/1963 | Baumann | 192/0.052 |
| 3,126,989 | 3/1964 | Baumann | 192/3.56 |
| 3,163,272 | 12/1964 | Baumann | 192/21.5 X |
| 3,163,273 | 12/1964 | Maier | 192/21.5 X |
| 3,250,341 | 5/1966 | Takahashi | 192/21.5 X |
| 3,628,642 | 12/1971 | Ravenal | 192/3.56 X |
| 4,027,554 | 6/1977 | Ito et al. | 192/3.58 X |
| 4,401,199 | 8/1983 | Takano et al. | 192/0.052 |

FOREIGN PATENT DOCUMENTS

| | | | |
|---|---|---|---|
| 1158377 | 11/1963 | Fed. Rep. of Germany | 192/21.5 |
| 1505402 | 4/1970 | Fed. Rep. of Germany | 192/0.052 |
| 0033430 | 3/1979 | Japan | 192/0.052 |
| 0131430 | 10/1981 | Japan | 192/0.052 |
| 1427039 | 3/1976 | United Kingdom | 192/0.076 |
| 2079888 | 1/1982 | United Kingdom | 192/0.076 |

Primary Examiner—Rodney H. Bonck
Attorney, Agent, or Firm—Martin A. Farber

[57] ABSTRACT

A system for controlling stall speed for an electromagnetic clutch having a magnetizing coil for engaging a crankshaft of an internal combustion engine with an input shaft of a transmission of a vehicle. A transistor switching circuit for allowing clutch current to flow through the magnetizing coil, and an electric circuit for producing pulses dependent on ignition pulses of the engine are provided for intermittently turning on the transistor for energizing the coil. A circuit including a time constant circuit and a switching transistor is provided for decreasing duty ratio of the pulses and for decreasing the clutch current. Switches are provided for detecting a heavy load condition at starting of the vehicle and for producing an output signal. The output signal is latched by a flip-flop and applied to the switching transistor thereby to decrease the duty ratio of the pulses for decreasing the clutch current with respect to the engine speed.

16 Claims, 4 Drawing Figures

4,550,816

SYSTEM FOR CONTROLLING STALL SPEED FOR AN ELECTROMAGNETIC CLUTCH

BACKGROUND OF THE INVENTION

The present invention relates to a system for controlling stall speed for an automatic electromagnetic clutch such as an electromagnetic powder clutch.

An automatic electromagnetic powder clutch for a vehicle engages when engine speed exceeds a stall speed for starting the vehicle. Generally, the stall speed is selected at a value lower than a speed which produces a maximum torque of the engine in order to avoid elevation of the temperature of the clutch and to smoothly start the vehicle. However, since the vehicle is not started at the maximum torque of the engine, it cannot produce sufficient power to climb a steep uphill slope.

SUMMARY OF THE INVENTION

The object of the present invention is to provide a system which controls the stall speed according to conditions during starting of the vehicle for raising the stall speed whereby the vehicle can be started at a maximum engine torque.

According to the present invention, there is provided a system for controlling stall speed for an electromagnetic clutch having a magnetizing coil for engaging a crankshaft of an internal combustion engine with an input shaft of a transmission of a vehicle. A transistor switching circuit for allowing clutch current to flow through the magnetizing coil, and a electric circuit for producing pulses dependent on ignition pulses of the engine are provided for intermittently turning on the transistor for energizing the coil. A circuit including a time constant circuit and a switching transistor is provided for decreasing the duty ratio of the pulses and for decreasing the clutch current. Switches are provided for detecting a heavy load condition at starting of the vehicle and for producing an output signal. The output signal is latched by a flip-flop and applied to the switching transistor to decrease the duty ratio of the pulses for decreasing the clutch current with respect to the engine speed.

The present invention will be more apparent from the following description made with reference to the accompanying drawings.

DETAILED DESCRIPTION OF THE PREFERRED EMBODIMENT

Figure 2:
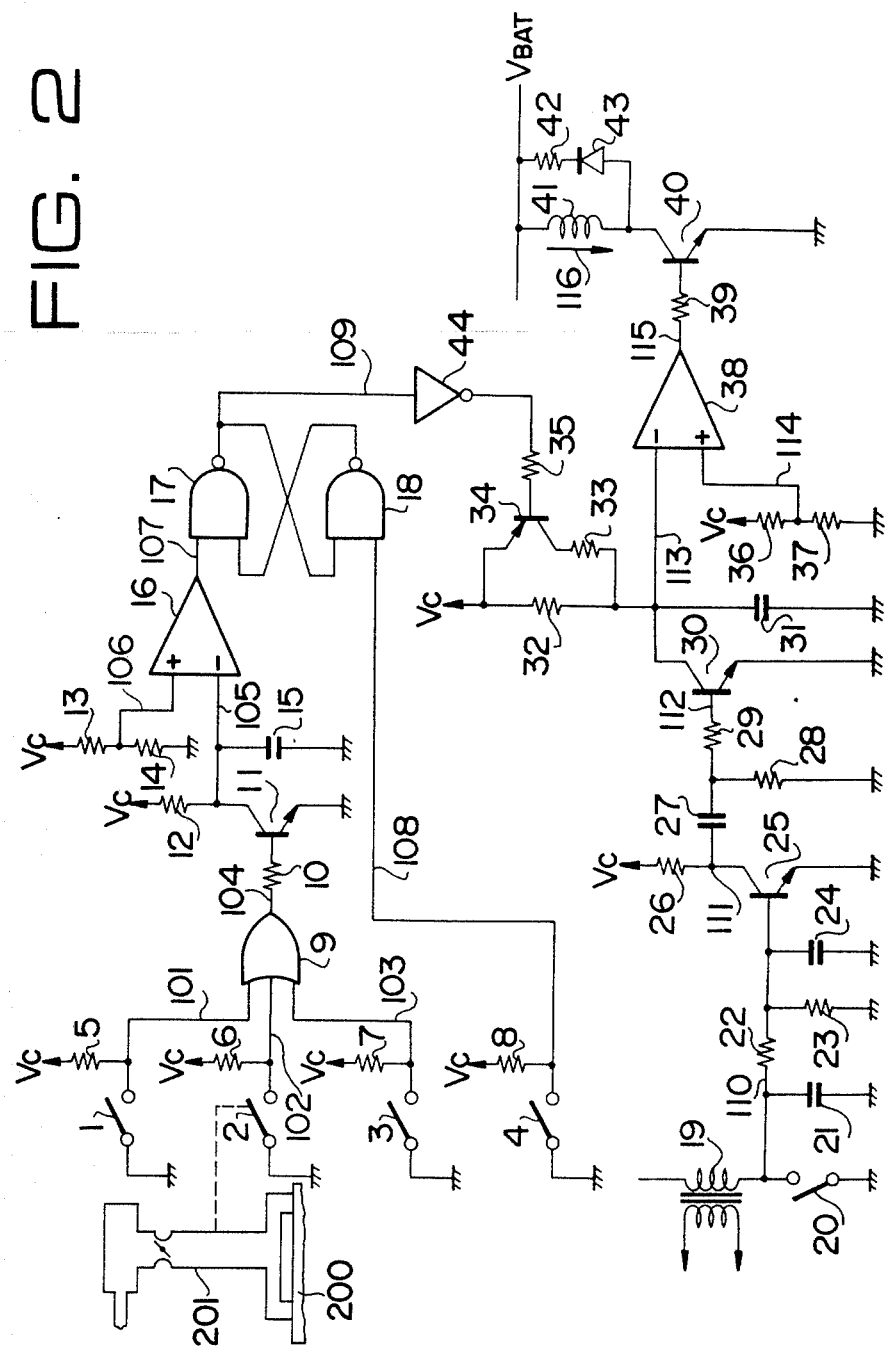
FIG. 2 is an electric circuit according to the present invention.
Figure 4:
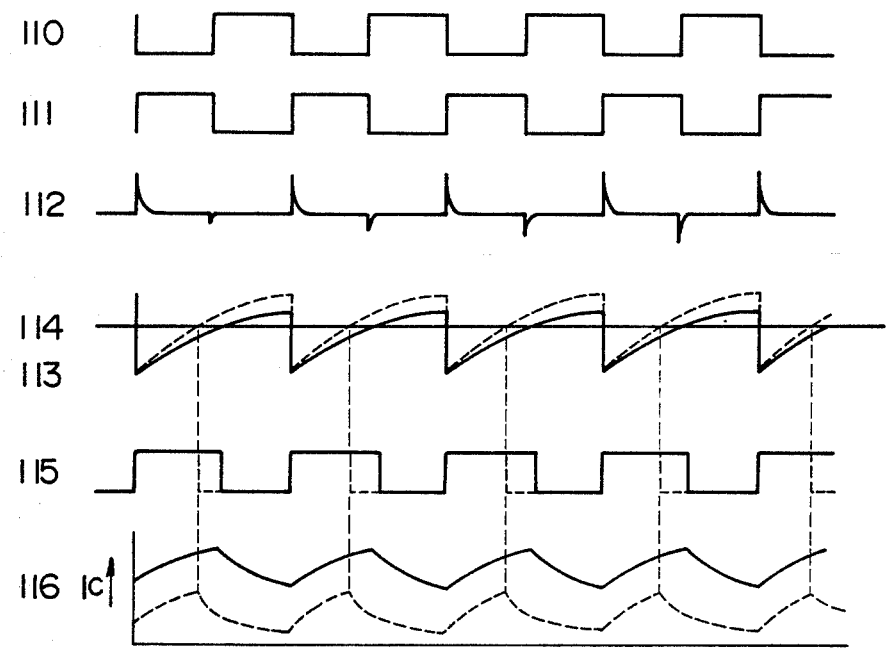

Referring to FIG. 2, the illustrated circuit is for an electromagnetic powder clutch, an input shaft of which is connected to a crankshaft of an engine and an output shaft of which is operatively connected to driving wheels of a vehicle through a transmission. The transmission is provided with a shift lever for changing gears and a shift lever switch 1 which is closed when the shift lever is shifted to its gear engaging positions. The system is further provided with a load detecting switch 2 comprising a vacuum switch which is closed when the vacuum in the induction passage 201 of the engine 200 decreases below a predetermined value in dependency on an increase of load. A vehicle speed switch 3 is provided which is closed when the vehicle speed is lower than a predetermined low speed, for example 3 Km/h. An engine speed switch 4 is closed at a high engine speed higher than a predetermined value. The load detecting switch 2 can be provided by a throttle valve position sensor and the engine speed switch 4 can be substituted by a vehicle speed switch which is closed at a corresponding speed, for example, about 15 Km/h.

Switches 1, 2 and 3 are connected to a constant voltage source Vc through resistors 5, 6 and 7, respectively, and connected to an OR gate 9. The output of the OR gate 9 is connected to a base of an NPN transistor 11 through a resistor 10. The emitter of its transistor is grounded and the collector is connected to the voltage source Vc through a resistor 12 and grounded through a capacitor 15, and also connected to an inverting terminal of a comparator 16. A non-inverting terminal of the comparator is applied with a reference voltage by resistors 13 and 14. The output of the comparator 16 is connected to a set input of a flip-flop comprising NAND gates 17 and 18. The engine speed switch 4 is connected to the voltage source Vc through a resistor 8 and is also connected to a reset input of the flip-flop.

On the other hand, a negative end of an ignition coil 19 is grounded through an ignition switch 20 and is also grounded through a capacitor 21. The negative end is further grounded through resistors 22 and 23 and grounded through a capacitor 24, and connected to a base of an NPN transistor 25 through the resistor 22. The collector of the transistor 25 is connected to the voltage source Vc through a resistor 26 and to one side of a capacitor 27. The other side of the capacitor 27 is grounded through a resistor 28 and connected to a base of an NPN transistor 30 through a resistor 29. The emitter of the transistor 30 is connected to the voltage source Vc through a resistor 32, grounded through a capacitor 31, and connected to an inverting input of a comparator 38. A PNP transistor 34 and a resistor 33 are connected in series to each other and connected to the resistor 32 in parallel. The base of the transistor 34 is connected to the output of the flip-flop through a resistor 35 and an inverter 44. The non-inverting terminal of the comparator 38 is applied with a reference voltage by resistors 36 and 37. The output of the comparator 38 is connected to a base of an NPN transistor 40 through a resistor 39. The collector of the transistor 40 is connected to an end of a magnetizing coil 41 of the electromagnetic powder clutch and the other end of the coil is connected to a battery terminal. The collector of the transistor 40 is also connected to the battery terminal through a resistor 42 and a diode 43.

Figure 3:
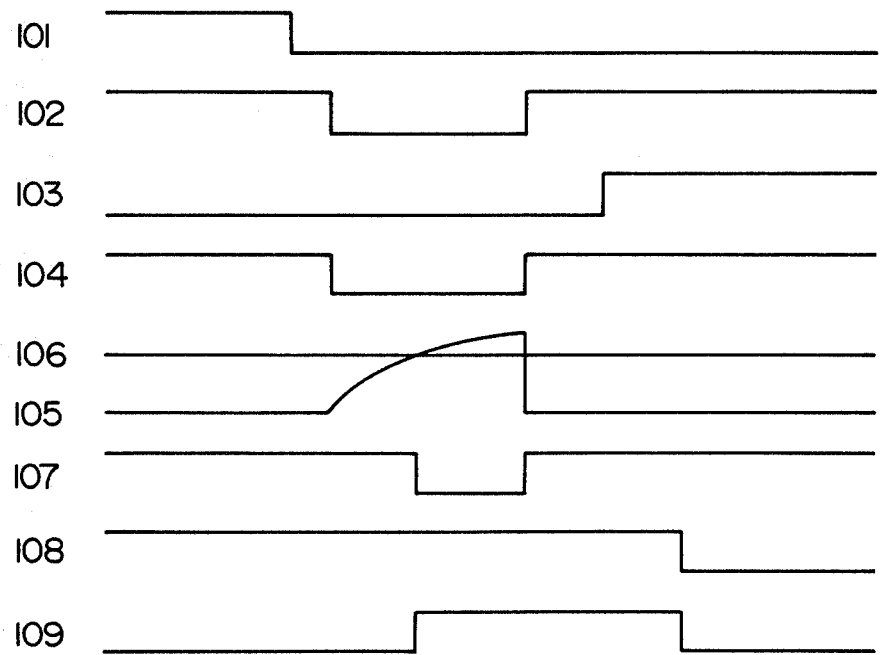
FIGS. 3 and 4 are waveforms at various portions of the circuit of FIG. 2.

In operation, when one of the switches 1, 2, 3 is closed, the level of one of the outputs 101, 102 and 103 changes to a low level as shown in FIG. 3, and the output of the OR gate 9 is at a high level, so that the transistor 11 is ON. When starting the vehicle at heavy load, for example, starting on a steep uphill slope, switches 1 to 3 close, causing the output 104 of the OR gate 9 to go to a low level as shown in FIG. 3. Since the transistor 11 is cut off, the capacitor 15 is charged (waveform 105). When the voltage 105 exceeds the reference voltage 106, the output 107 of the comparator goes to a low level. If the low level duration of the output 104 is short, the voltage 105 does not exceed the reference voltage 106, so that the output 107 remains at a high level. When the output 107 goes to the low level, the output 109 of the flip-flop goes to a high level. The output of the flip-flop remains at the high level until the switch 4 is closed at a high engine speed to produce a low level output 108 as shown in FIG. 3, rendering the transistor 34 conductive. The high level output of the flip-flop is inverted by the inverter 44.

Figure 1:
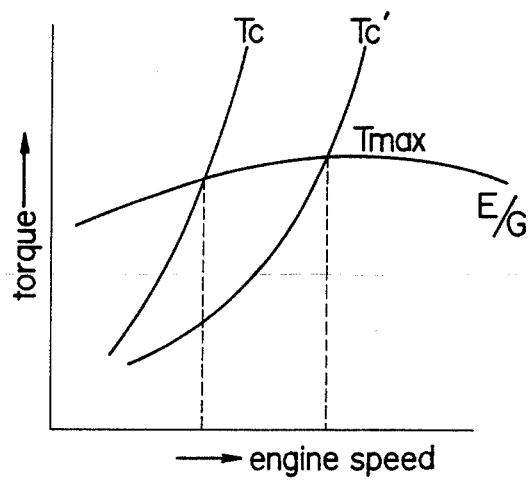
FIG. 1 is a graph showing engine torque characteristics and clutch torque characteristics.

On the other hand, ignition pulses are shaped as shown by waveforms 110 and 111. The output 111 is differentiated by the capacitor 27 and resistor 28 to produce a waveform 112 thereby producing a waveform 113 at the capacitor 31. When the transistor 34 is ON by the low level output of the inverter 44, the waveform 113 becomes a waveform as shown by the dashed line because of a short time constant. The voltage of the waveform 113 is compared with the reference voltage 114 by the comparator 38 to produce output pulses 115 to intermittently turn on the transistor 40. Thus, clutch current 116 flows through the coil 41. When the transistor 34 is ON, the pulses 115 are represented by the dashed line, that is the duty ratio of the pulses 115 decreases. Therefore, the clutch current 116 is decreased as shown by a dashed line. On the other hand, the clutch current increases with an increase of the engine speed, so that the clutch torque increases as the engine speed increases as shown in FIG. 1. The fact that the clutch current at the high level output 109, that is when starting on a steep uphill slope, is lower than the current at a light load starting at the same engine speed, means that the stall speed is elevated. Thus, the vehicle is started approximately at a maximum engine torque.

The curve Tc of FIG. 1 shows clutch torque at an ordinary load condition and the curve Tc' shows clutch torque at a heavy load condition.

When the engine speed reaches a predetermined value and the switch 4 is closed, the output 109 of the flip-flop goes to a low level, causing the transistor 34 to cut off. Thus, the clutch current increases to a rated current.

In accordance with the present invention, the stall speed is increaseed under heavy load starting of a vehicle. Thus, the vehicle can be started on a steep uphill slope at a maximum engine torque.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A system for controlling stall speed for an electromagnetic clutch having a magnetizing coil for engaging a crankshaft of an internal combustion engine with an input shaft of a transmission of a vehicle, comprising:
    means comprising a first electric circuit for allowing clutch current to flow through said magnetizing coil;
    means comprising a second electric circuit for increasing said clutch current with an increase of engine speed;
    a third electric circuit having two states, one of said states being a low clutch current providing state which decreases the clutch current;
    heavy load detecting means for producing a first signal at heavy load conditions of the engine;
    means comprising a vehicle speed switch for producing a second signal in a low vehicle speed range below a low predetermined speed;
    gate circuit means responsive to simultaneous occurrence of the first and second signals for producing a third signal;
    means comprising a fourth electric circuit responsive to the third signal for producing a fourth signal for changing said third electric circuit to the low clutch current providing state.

2. The system for controlling stall speed according to claim 1 wherein
    said first electric circuit is a transistor connected to said magnetizing coil in series,
    said second electric circuit is a pulse train generating circuit dependent on operation of an ignition coil of said engine.

3. The system for controlling stall speed according to claim 2 wherein
    said third electric circuit comprises means for decreasing the duty ratio of pulses of said pulse train in the low clutch current providing state.

4. The system for controlling stall speed according to claim 3 wherein
    said fourth electric circuit includes a flip-flop means for latching said fourth signal upon occurrence thereof, and
    a speed switch means which is closed when speed is higher than a predetermined value for producing an output signal for releasing the latching of said flip-flop means.

5. The system for controlling stall speed according to claim 4, wherein
    said speed switch means is responsive to engine speed.

6. The system for controlling stall speed according to claim 4, wherein
    said speed switch means is responsive to vehicle speed.

7. The system for controlling stall speed according to claim 1, 2 or 3 further comprising
    a shift lever switch which is closed producing a closed signal when a transmission gear of said transmission is in engaging state, and
    said gate circuit means is responsive to simultaneous occurrence of the first and second signals and said closed signal for producing said third signal.

8. The system for controlling stall speed according to claim 7, wherein
    said fourth electric circuit includes means for delaying said fourth signal until said third signal continues a predetermined time.

9. The system for controlling stall speed according to claim 5, wherein
    said gate circuit means comprises an OR gate.

10. The system for controlling stall speed according to claim 1, wherein
    said clutch is a power clutch.

11. The system for controlling stall speed according to claim 1, wherein
    said heavy load detecting means is a vacuum switch.

12. The system for controlling stall speed according to claim 1, wherein
    said heavy load detecting means is a throttle valve position sensor.

13. The system for controlling stall speed according to claim 1, wherein said second electric circuit comprises an RC circuit connected between a voltage source and including a first resistor, and said third electric circuit includes a branch containing a second resistor and a transistor connected in series to said second resistor, said transistor being operatively connected to said fourth electric circuit, and said branch is connected in parallel to said first resistor.

14. The system for controlling stall speed according to claim 1, wherein said fourth electric circuit includes means for delaying said fourth signal until said third signal continues a predetermined time.

15. The system for controlling stall speed according to claim 1, further comprising said fourth electric circuit including means for holding said fourth signal until speed reaches a predetermined value.

16. The system for controlling stall speed according to claim 1, wherein said gate circuit means comprises an OR gate.

* * * * *